(12) United States Patent
Barth et al.

(10) Patent No.: US 6,741,472 B1
(45) Date of Patent: May 25, 2004

(54) SECURE HINGE MECHANISM FOR PORTABLE COMPUTER

(75) Inventors: Hans A. Barth, Fort Lauderdale, FL (US); Paul A. Wynn, Jupiter, FL (US)

(73) Assignee: WalkAbout Computers, Inc., West Palm Beach, FL (US)

( * ) Notice: Subject to any disclaimer, the term of this patent is extended or adjusted under 35 U.S.C. 154(b) by 30 days.

(21) Appl. No.: 10/289,971

(22) Filed: Nov. 6, 2002

(51) Int. Cl.[7] .................................................. G06F 1/16
(52) U.S. Cl. .......................... 361/725; 361/727; 16/368; 312/223.1
(58) Field of Search ................................ 361/679–682, 361/724–727; 16/368, 381, 340, 342; 312/223.1–223.6; 364/708.1

(56) References Cited

U.S. PATENT DOCUMENTS

| | | | |
|---|---|---|---|
| 4,864,692 A | 9/1989 | Prevot et al. ................. 16/381 |
| 5,253,142 A | 10/1993 | Weng ......................... 361/681 |
| 5,425,157 A | 6/1995 | Chang ......................... 16/381 |
| 5,666,694 A | 9/1997 | Slow et al. .................... 16/368 |
| 5,805,474 A | 9/1998 | Danielson et al. .......... 361/683 |
| 5,844,772 A | 12/1998 | Lee et al. ................... 361/683 |
| 5,987,703 A | 11/1999 | Kluting et al. ................ 16/262 |
| 6,052,279 A | 4/2000 | Friend et al. ................ 361/686 |
| 6,144,552 A | 11/2000 | Whitcher et al. ............ 361/681 |
| 6,249,951 B1 * | 6/2001 | Saida et al. .................... 29/434 |
| 6,286,187 B1 * | 9/2001 | Chang ........................... 16/340 |
| 6,304,433 B2 * | 10/2001 | O'Neal et al. ............... 361/681 |
| 6,338,182 B1 | 1/2002 | Tseng et al. .................. 16/368 |
| 6,381,809 B2 | 5/2002 | Uneme et al. ................. 16/342 |
| 6,388,870 B1 | 5/2002 | Canova, Jr. et al. ......... 361/683 |
| 6,388,877 B1 | 5/2002 | Canova, Jr. et al. ......... 361/686 |
| 6,426,872 B1 | 7/2002 | Sutton et al. ................ 361/686 |
| 6,430,777 B1 | 8/2002 | Lu ............................... 16/340 |
| 2001/0012197 A1 | 8/2001 | O'Neal et al. ................ 16/368 |

* cited by examiner

Primary Examiner—Hung Van Duong
(74) Attorney, Agent, or Firm—Jon A. Gibbons; Fleit, Kain, Gibbons, Gutman, Bongini & Bianco P.L.

(57) ABSTRACT

A system for pivotally coupling two elements of a portable computer is disclosed. The system includes a hinge pin for pivotally coupling the two elements. The hinge pin includes a rod having a main axis and a first outer diameter. The hinge pin further includes a bore in a proximal portion of the rod having a first inner diameter, wherein the bore is aligned along the main axis. The hinge pin further includes a distal portion of the bore having a second inner diameter larger than the first inner diameter. The hinge pin further includes a groove stop within the bore, providing a surface for pulling the hinge pin along the main axis in a proximal direction. The system further includes a tool for extracting the hinge pin from the two elements, allowing the hinge pin to be pulled along the main axis in a proximal direction.

20 Claims, 11 Drawing Sheets

SECURE HINGE MECHANISM FOR PORTABLE COMPUTER

BACKGROUND OF THE INVENTION

1. Field of the Invention

This invention generally relates to the field of portable computers and more specifically to a hinge pin device for assembling portable computers.

2. Description of Related Art

The use of portable computers is on the rise. With the advent of the laptop computer, users began using computers in places other than offices and homes. Today, students, workers and individuals of all walks of life are carrying portable computers for studying, working, communicating and performing many different tasks. With the introduction of the palmtop computer, the handheld computer, the tablet computer and hybrid computers, the use of portable computers is continuing to increase. Further, the use of portable computers is growing in industries such as utilities, public safety, transportation, distribution, manufacturing, government, and construction. The average medium or large company has an average of 1,500 laptops. Also, the military has expanded its use of portable computers. Portable computers, however, are typically fragile and costly to repair or replace. In the year 2000, U.S. corporations were estimated to spend over $1 billion to repair or replace damaged laptops.

The problem of fragile portable computers has been met with the introduction of the ruggedized portable computer. Ruggedized portable computers are designed to withstand harsh environments, rough treatment and the daily rigors of field use. These computers sport strong and impermeable housings that guard against dropping, banging, spilling and even immersion in water. Ruggedized portable computers have enjoyed a variety of uses, such as being installed in-plant, in-vehicle or in remote outdoor locations, making it a popular choice for oil, gas, electric, cable, water, and telecommunications utilities, fire and police departments, EMS and rescue services, and companies involved in transportation and distribution, materials handling, and heavy construction. Ruggedized portable computers help to eliminate downtime, increase operator productivity and upgrade system efficiency.

Ruggedized portable computers require an airtight seal. This allows the computer to prevent water, moisture and other liquids from entering the central processing unit. Airtight seals, however, degrade over time and are difficult to create. In addition, ruggedized portable computers require a housing that is not easily disassembled. Computers in the field may fall into the wrong hands or their rightful owners may attempt to fix a problem in the computer. These problems can be avoided by creating a housing that can only be disassembled in a particular way or requiring a particular tool. Creating a housing that is not easily disassembled, however, can be costly and complicated.

Therefore, a need exists to overcome the problems with the prior art as discussed above.

SUMMARY OF THE INVENTION

Briefly, in accordance with the present invention, disclosed is a system for pivotally coupling two elements of a portable computer. In an embodiment of the present invention, the system includes a hinge pin for pivotally coupling the two elements. The hinge pin includes a rod having a main axis and a first outer diameter. The hinge pin further includes a bore in a proximal portion of the rod having a first inner diameter, wherein the bore is aligned along the main axis. The hinge pin further includes a distal portion of the bore having a second inner diameter larger than the first inner diameter. The hinge pin further includes a groove stop within the bore formed by the juxtaposition of the first inner diameter and the second inner diameter, wherein the groove stop provides a surface for pulling the hinge pin along the main axis in a proximal direction. The system further includes a tool for extracting the hinge pin from the two elements, wherein the tool is inserted into the bore and contacts the surface provided by the groove stop, thereby allowing the hinge pin to be pulled along the main axis in a proximal direction.

In another embodiment of the present invention, the tool includes a bushing aligned along the main axis, having a third outer diameter smaller than the first inner diameter. The tool further includes a rod aligned along the main axis positioned within the bushing and at least one ball bearing having a fourth diameter located between the rod and the bushing at a distal end of the rod and the bushing. The tool further includes at least one aperture in the distal end of the bushing adjacent to the at least one ball bearing, the at least one aperture having a fifth diameter smaller than the fourth diameter, wherein the at least one ball bearing protrudes from the at least one aperture when the at least one ball bearing is pushed against the at least one aperture. The tool further includes a circular groove around the distal end of the rod, wherein when the at least one ball bearing is positioned within the circular groove, the at least one ball bearing does not protrude from the at least one aperture, and wherein when the at least one ball bearing is not positioned within the circular groove, the at least one ball bearing protrudes from the at least one aperture. The tool is inserted into the bore and the rod is moved such that the at least one ball bearing is not positioned within the circular groove, causing the at least one ball bearing to protrude from the at least one aperture and contact the surface provided by the groove stop, thereby allowing the tool and the hinge pin to be pulled along the main axis in a proximal direction.

The described embodiments of the present invention are advantageous as they allow for a portable computer to be constructed in a housing that is not easily disassembled. This prevents unwanted or unnecessary tampering with the central processing unit of the portable computer. Another advantage of the present invention is that the described hinge pin can be used to create an airtight seal within the portable computer. The hinge pin can be inserted into a hinge aperture coupling two elements of the portable computer as the two elements are compressed. After insertion, compression is released and pressure is placed on the hinge pin. This creates an airtight seal between the two elements and prevents the hinge pin from being easily removed.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally.

DETAILED DESCRIPTION OF THE PREFERRED EMBODIMENTS

I. Overview

Figure 1:
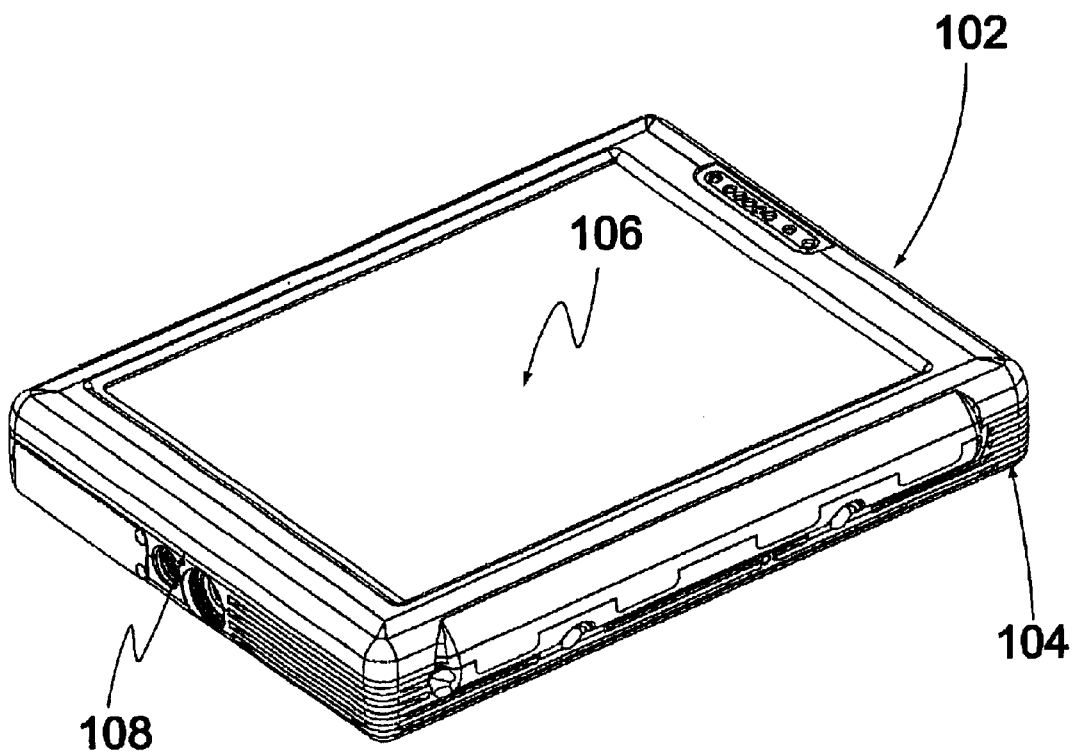
FIG. 1 is an illustration of a tablet portable computer according to one embodiment of the present invention.

FIG. 1 is an illustration of a tablet portable computer according to one embodiment of the present invention. The tablet computer is a Hammerhead Rugged Tablet Computer available from WalkAbout Computers of West Palm Beach, Fla., a Tablet PC available from Microsoft Corp. of Redmond, Wash. or the like. Alternatively, the portable computer of FIG. 1 is a laptop computer, a palmtop computer, a PDA computer, a handheld computer, or the like.

FIG. 1 shows that the tablet portable computer consists of a housing including an upper portion 102 and a lower portion 104. The tablet portable computer includes a display 106 and a set of terminals 108 for connecting computer peripherals.

II. Portable Computer

Figure 2:
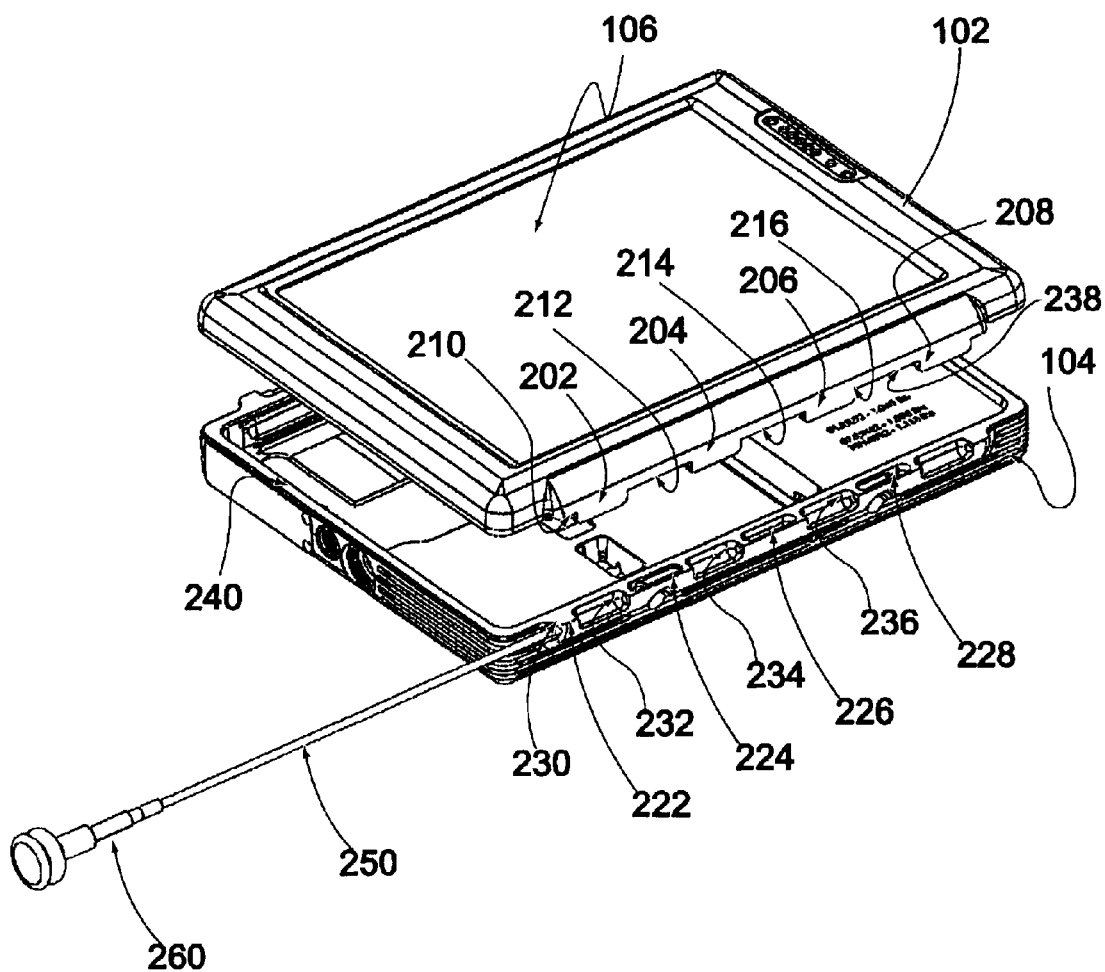
FIG. 2 is an illustration of the tablet portable computer of FIG. 1 in a disassembled state.

FIG. 2 is an illustration of the tablet portable computer of FIG. 1 in a disassembled state. FIG. 1 shows the upper portion 102 of the tablet portable computer separated from the lower portion 104 of the tablet portable computer prior to assembly. FIG. 2 shows that the upper portion 102 of the tablet portable computer includes a plurality of fingers 202, 204, 206 and 208 aligned along a first axis that runs along an edge of the upper portion 102 of the tablet portable computer. Each finger 202, 204, 206 and 208 extends downwards from the upper portion 102 and extends horizontally along the first axis. Between each finger is a gap that separates the two. Each finger 202, 204, 206 and 208 also includes an aperture that extends through the finger along the first axis. Finger 202 includes aperture 210, finger 204 includes aperture 212, finger 206 includes aperture 214 and finger 208 includes aperture 216. All apertures 210, 212, 214 and 216 are aligned collinearly along the first axis 238. It should be noted that the upper portion 102 includes another set of fingers and apertures on the opposite side of upper portion 102 (not shown).

Similarly, FIG. 2 shows that the lower portion 104 of the tablet portable computer includes a plurality of fingers 222, 224, 226 and 228 aligned along a second axis 240 that runs along an edge of the lower portion 104 of the tablet portable computer. Each finger 222, 224, 226 and 228 extends upwards from the lower portion 104 and extends horizontally along the second axis. Between each finger is a gap that separates the two. Each finger 222, 224, 226 and 228 also includes an aperture that extends through the finger along the second axis. Finger 222 includes aperture 230, finger 224 includes aperture 232, finger 226 includes aperture 234 and finger 228 includes aperture 236. All apertures 230, 232, 234 and 236 are aligned collinearly along the second axis 240. It should be noted that the lower portion 104 includes another set of fingers and apertures on the opposite side of upper portion 104 (not shown).

Figure 3:
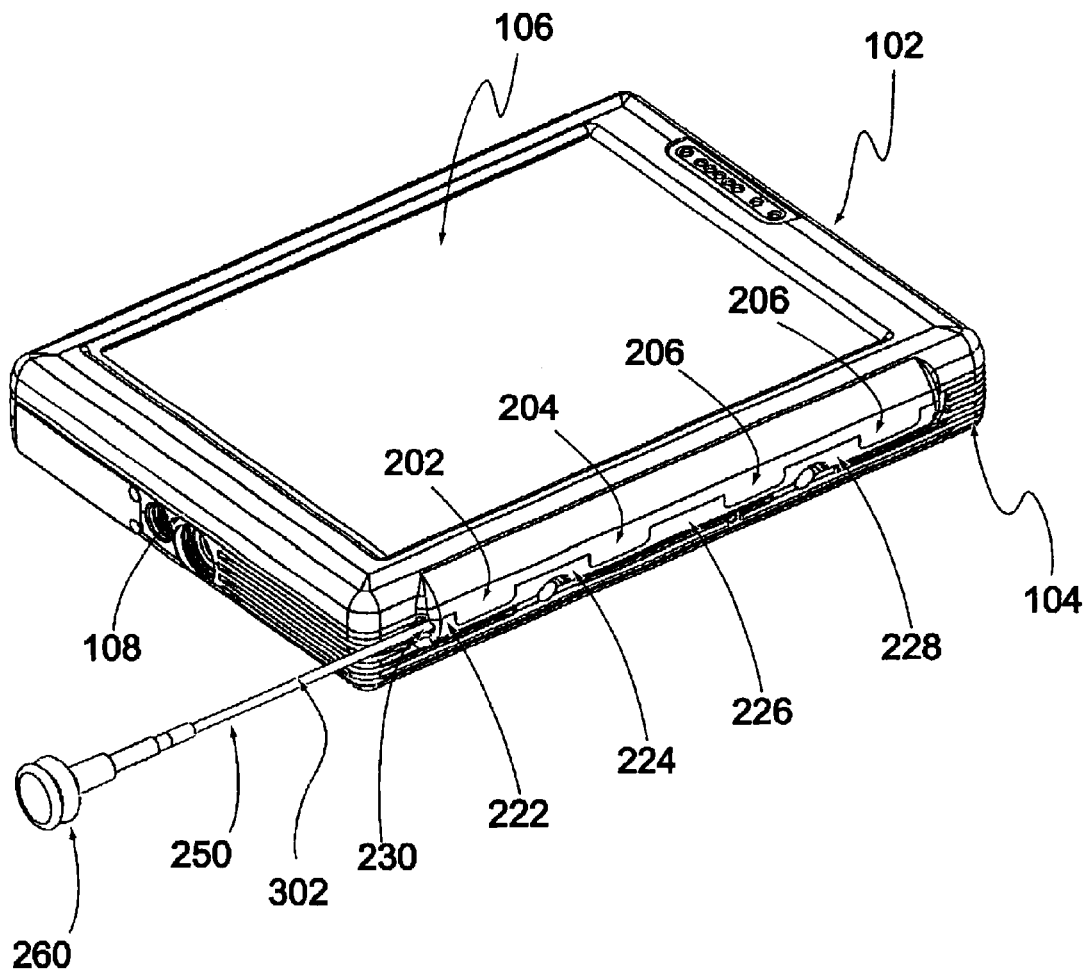
FIG. 3 is an illustration of the tablet portable computer of FIG. 1 during assembly.

It should be noted that when the upper portion 102 and the lower portion 104 are joined, the first axis 238 and the second axis 240 are aligned to determine a common axis 302 in FIG. 3. Consequently, the apertures 210, 212, 214 and 216 of the upper portion 102 are collinearly aligned along the common axis with the apertures 230, 232, 234 and 236 of the lower portion 104 when the upper portion 102 and the lower portion 104 are joined. This is described in greater detail below in FIG. 3. It should also be noted that the fingers 202, 204, 206 and 208 and the corresponding gaps of upper portion 102 are arranged such that the fingers 222, 224, 226 and 228 and the corresponding gaps of lower portion 104 interconnect when the upper portion 102 and the lower portion 104 are joined. (See FIG. 3)

FIG. 2 also shows an O-ring 240 that is positioned along the outer edge of the lower portion 104. The O-ring 240 is a washer-type of device made from an elastic material, such as natural or synthetic rubber, plastic, polymer, and other materials, which compress when placed under pressure. The O-ring 240 is located along the outer edge of the lower portion 104 such that it contacts the upper portion 102 when the upper and lower portions 102, 104 are joined together. The joining of the upper and lower portions 102, 104 creates an airtight seal enabled by the O-ring 240. As the upper and lower portions 102, 104 are pressed together and the O-ring 240 is placed under pressure, the O-ring 240 and deforms to fill in any orifices that may exist between upper and lower portions 102, 104. This produces an airtight seal between upper and lower portions 102, 104 as long as an adequate amount of pressure is exerted onto the O-ring 240 from upper and lower portions 102, 104.

FIG. 2 also shows a hinge pin 250 and a tool 260. The hinge pin 250 and the tool 260 are described in greater detail below.

FIG. 3 is an illustration of the tablet portable computer of FIG. 1 during assembly. FIG. 3 shows that the upper and lower portions 102, 104 are joined together. The joining of the upper and lower portions 102, 104 creates an airtight seal enabled by the O-ring 240 as long as an adequate amount of pressure is exerted onto the O-ring 240 from upper and lower portions 102, 104.

In an embodiment of the present invention, only when an adequate amount of pressure is exerted onto the O-ring 240 from upper and lower portions 102, 104, does 1) an airtight seal exist between the upper portion 102 and the lower portion 104, 2) the first axis align with the second axis along a main axis, 3) the apertures 210, 212, 214 and 216 of the upper portion 102 collinearly align along the main axis with the apertures 230, 232, 234 and 236 of the lower portion 104 and 4) the fingers 202, 204, 206 and 208 and the corresponding gaps of upper portion 102 interconnect with the fingers 222, 224, 226 and 228 and the corresponding gaps of lower portion 104. That is, the upper portion 102 is not adequately coupled with the lower portion 104 if the upper portion 102 is simply placed, or lies on the lower portion 104. Rather, the upper portion 102 and the lower portion 104 must be pressed together tightly to compress the O-ring 240 and align those elements that must be aligned for proper assembly of the tablet portable computer. This is typically accomplished using a special fixture or jig.

Returning to FIG. 3, the hinge pin 250 and the corresponding tool 260 are connected. This process is described in greater detail below. The hinge pin 250 is shown to be partially inserted into the aperture 230 and extending through subsequent apertures along the main axis. In this way, the hinge pin 250 is subsequently inserted through all of the remaining apertures 212, 214, 216 230, 232, 234 and 236 until all fingers 202, 204, 206, 208 of the upper portion 102 are pivotally connected with all fingers 222, 224, 226 and 228 of the lower portion 104. The tool 260 includes a flat-headed end portion facilitating the application of pressure with a hand to the tool 260 and enabling insertion of the hinge pin 250 into the portable computer.

In an embodiment of the present invention, the upper portion 102 and the lower portion 104 must be pressed together tightly in order to insert the hinge pin 250 through all of the apertures 210, 212, 214, 216 230, 232, 234 and 236. In this embodiment, the lack of application of adequate pressure between upper and lower portions 102, 104 results in a lack of an airtight seal between the upper and lower portions 102, 104 and a misalignment of apertures 210, 212, 214 and 216 of the upper portion with the apertures 230, 232, 234 and 236 of the lower portion 104.

III. Hinge Pin Insertion and Removal Tool

Figure 4:
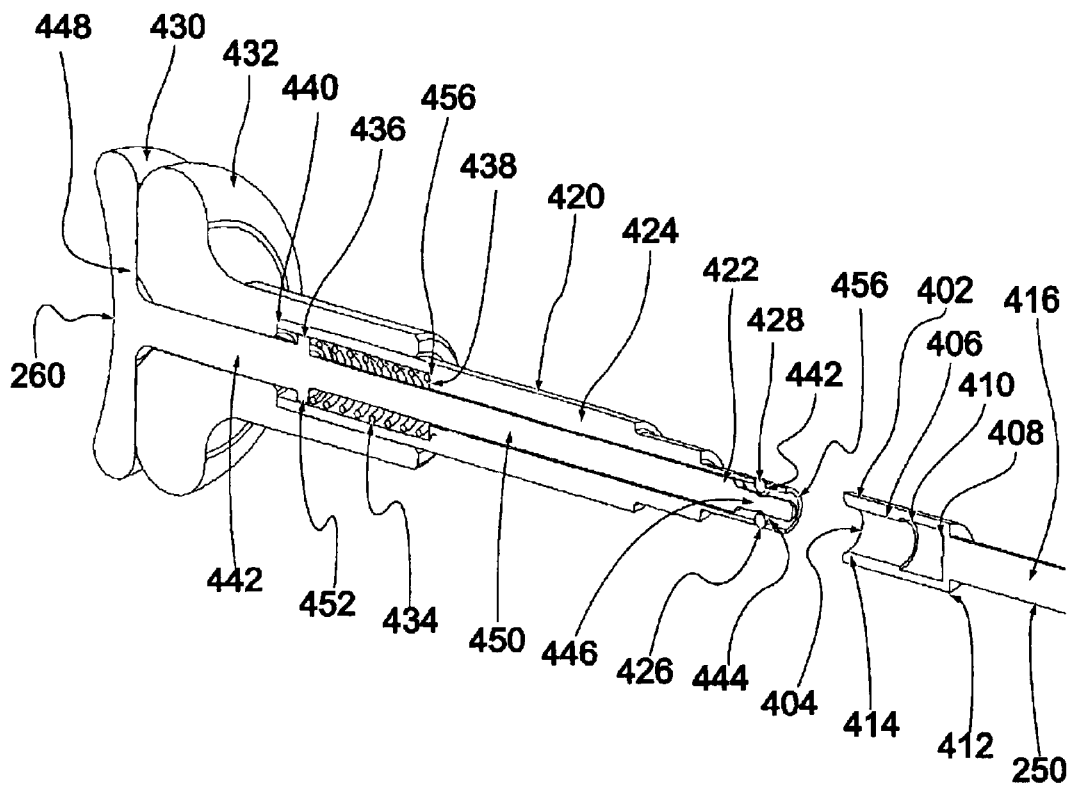
FIG. 4 is a cross sectional view of a hinge pin and a corresponding tool, according to one embodiment of the present invention.

FIG. 4 is a cross sectional view of the hinge pin 250 and the corresponding tool 260, according to one embodiment of the present invention. FIG. 4 shows the hinge pin 250 and the corresponding tool 260 is a disconnected state. The hinge pin 250 comprises a cylindrical elongated member (i.e., a rod) having distal 412 and proximal 414 ends and being aligned along a main axis 416. FIG. 4 shows that the majority of the hinge pin 250 is a cylinder of a first outer diameter. Referring to the proximal portion of the hinge pin 250, it is shown that an end portion 402 is of a second outer diameter greater than the first outer diameter. Also shown is a cylindrical bore 404 of a first inner diameter 406 drilled or formed into the end portion 402 of the hinge pin 250 and also being aligned along the main axis. The bore 404 extends into the hinge pin 250 only as far as the end portion 402, i.e., the bore 404 extends into the hinge pin 250 only as far as the hinge pin 250 is of the second outer diameter.

FIG. 4 shows that an inner or distal portion of the bore 404 is of a second inner diameter 408 larger than the first inner diameter 406. The juxtaposition of the first inner diameter 406 with the second inner diameter 408 produces a small ledge or groove stop 410 at the point of juxtaposition. Because the second inner diameter 408 is larger than the first inner diameter 406, the surface of the groove stop 410 faces the proximal direction. Thus, the groove stop 410 provides a surface for pulling the hinge pin 250 along the main axis in a proximal direction. This is explained in greater detail below.

The tool 260 comprises a cylindrical elongated member (i.e., a rod) 424 having distal and proximal ends and being aligned along the main axis. Tool 260 further comprises a bushing 420 having distal end at the end of tool 260 and proximal end 448 and being aligned along the main axis 450. An end portion 422 of the bushing 420 is of a third outer diameter. The third outer diameter is substantially equal to the first inner diameter 406, allowing the end portion 422 of the bushing 420 to be inserted into the bore 404 along the main axis 416. The rod 424 is positioned within the bushing 420.

The tool 260 further comprises an optional handle 432 coupled to the proximal end 448 of the bushing 420. The handle 432 is a circular disc-shaped apparatus with contoured edges for comfortable handling by a person's hand. The handle 432 is coupled perpendicularly to the bushing 420 such that the main axis 450 intersects the center point of the disc-shaped handle 432. Note that handle 432 also includes an aperture 442 through which a portion of rod 424 extends. This is explained in greater detail below.

The tool 260 further comprises a spring 434 for pushing rod 424 in the distal direction. The spring 434 is helical in shape and surrounds the rod 424 such that the center axis of spring 424 is aligned along the main axis 450. The spring 434 is positioned within a cavity formed 436 within bushing 420, consisting of a larger inner diameter within bushing 420 and two groove stops—groove stop 438 at the distal end of the cavity and groove stop 440 at the proximal end of the cavity.

The proximal end 452 of the spring 434 contacts a toroidal shaped structure 436, which is attached to and surrounds the rod 424 such that the main axis 450 intersects the center point of the toroidal shaped structure 436. The outer diameter of the toroidal shaped structure 436 is larger than the outer diameter of the rod 424 and smaller than the inner diameter of the bushing 420 at the location of the spring 434. Because the toroidal shaped structure 436 is fixed to the rod 424, the proximal end 438 of the spring 424 does not extend beyond the toroidal shaped structure 436 but rather places pressure on the toroidal shaped structure 436 in the proximal direction as the spring 434 naturally seeks to expand.

Note that the inner diameter of the aperture of handle 432, through which rod 424 extends, is smaller than the inner diameter of the bushing 420 at the location of the spring 232. This produces a groove stop 440, similar to, but opposite to, groove stop 438 (described in greater detail below). The groove stop 440 is formed from the juxtaposition of the inner diameter of the bushing 420 with the smaller inner diameter of the aperture of handle 432. The groove stop 440 produces a surface facing the distal direction. This surface provides a barrier for the toroidal shaped structure 436 since the inner diameter of the aperture of handle 432 is smaller than the outer diameter of the toroidal shaped structure 436. Thus, the groove stop 440 prevents the toroidal shaped structure 436 from traveling in the proximal direction past the groove stop 440.

The distal end of the spring 424 contacts a groove stop 438 inside the bushing 420. The groove stop 438 is formed from the juxtaposition of one inner diameter of the bushing 420 with another, larger inner diameter of the bushing 420. The groove stop 438 produces a surface facing the proximal direction. Thus, the distal end of the spring 424 does not extend beyond the groove stop 438 but rather places pressure on the groove stop 438 in the distal direction as the spring 434 naturally seeks to expand.

The tool 260 further comprises a second optional handle 430 coupled to a proximal end 434 of the rod 424. The handle 430 is a circular disc-shaped apparatus with contoured edges for comfortable handling by a person's hand. The handle 430 is coupled perpendicularly to the rod 424 such that the main axis intersects the center point of the disc-shaped handle 430. Note that handle 430 is attached to the proximal end of the rod 424, which extends through an aperture 442 within handle 432, and that handle 430 is positioned behind, or proximally, from the handle 432.

The tool 260 further comprises ball bearings 426 and 428 located at the distal end 452 of the tool 260 in between the rod 424 and the bushing 420. The distal end 452 of the rod 424 is of a small outer diameter than the remaining portion of the rod 424. This allows space for the positioning of the ball bearings 426 and 428 in between the rod 424 and the bushing 420. The ball bearings 426 and 428 are held in position by a circular groove 446 formed into the distal end of the rod 424. The form of the circular groove 446 allows the ball bearings 426 and 428 to rest within the circular groove 446. The ball bearings 426 and 428 are also held in position by apertures 442 and 444, wherein one aperture corresponds to each ball bearing. The diameter of each aperture 442 and 444 is smaller than the diameter of each ball bearing 426 and 428. This prevents the ball bearings from passing through any of the apertures.

Tool 260, as shown in FIG. 4, illustrates the state of the tool 260 when the handle 430 and the connected rod 424 are pushed in the distal direction. When the handle 430 contacts the handle 432, this prevents the handle 430 and the connected rod 424 from being pushed further in the distal direction. In this state, the spring 434 is compressed within its cavity. Thus, when the handle 430 is pushed as far as possible in the distal direction, the ball bearings 426 and 428 rest within the circular groove 446 and are not forced outwards into the corresponding apertures 442 and 444. That is, the circular groove 446 allows the ball bearings 426 and 428 to rest within the bushing 420 and there is no pressure exerted upon the ball bearings 426 and 428 in the direction of the apertures 442 and 444.

When the tool 260 is in a state of rest (shown in FIG. 7), however, the spring 434 naturally seeks to expand within its cavity and exerts pressure against the groove stop 438 in a distal direction towards the distal end 456 and pressure against the toroidal shaped structure 436 in a proximal direction towards the proximal end 434. This results in the rod 424 and the connected handle 430 to be pushed in the proximal direction. However, groove stop 440 contacts the toroidal shaped structure 436 and prevents the rod 424 and the connected handle 430 from traveling further in the proximal direction. In addition, when the handle 430 is pushed as far as possible in the proximal direction, the ball bearings 426 and 428 do not rest within the circular groove 446 and are forced outwards into the corresponding apertures 442 and 444 such that they protrude from their respective apertures. That is, pressure is exerted upon the ball bearings 426 and 428 in the direction of the apertures 442 and 444 such that they protrude from their respective apertures.

Figure 5:
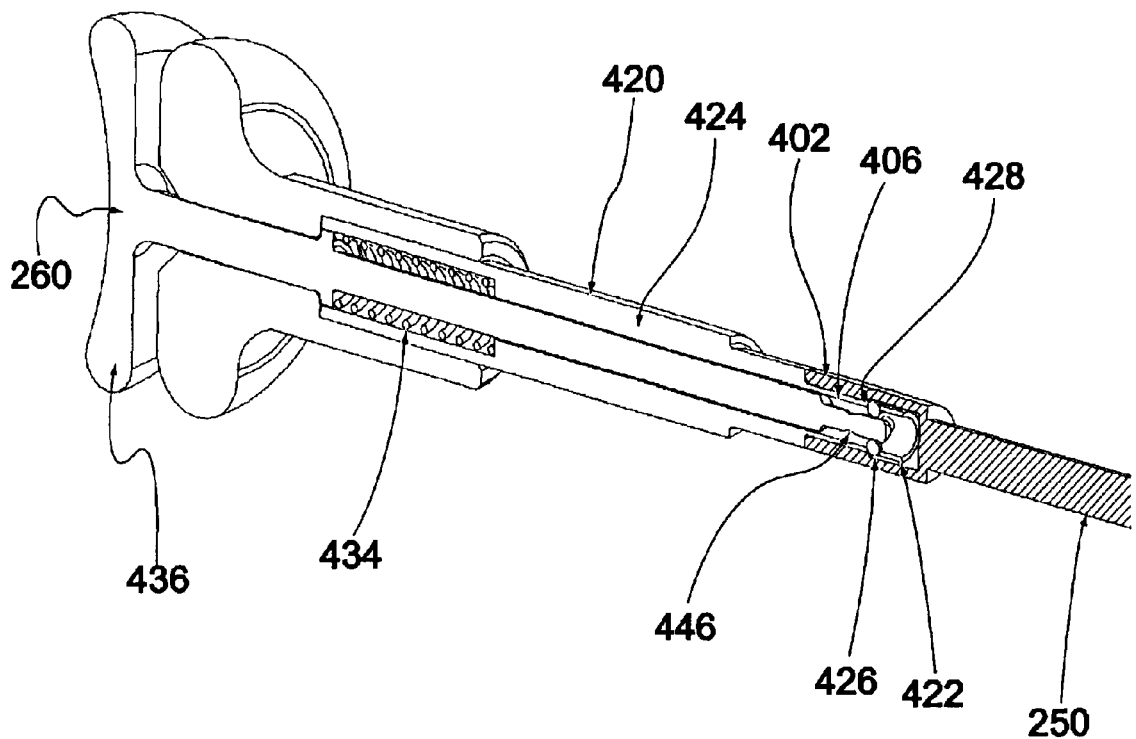
FIG. 5 is a cross sectional view of the hinge pin and the tool of FIG. 4 in a coupled state.

FIG. 5 is a cross sectional view of the hinge pin 250 and the tool 260 of FIG. 4 in a coupled state. FIG. 5 shows that the end portion 422 of the bushing 420 of the tool 260 is of a third outer diameter smaller than the first inner diameter 406 of the bore 404, allowing the end portion 422 of the bushing 420 to be inserted into the bore 404 along the main axis.

It should be noted, however, that tool 260, as shown in FIG. 5, is in a state of use. FIG. 5 illustrates the state of the tool 260 when the handle 430 and the connected rod 424 are pushed in the distal direction. In this state, the spring 434 is compressed within its cavity and the handle 430 is pushed as far as possible in the distal direction such that the ball bearings 426 and 428 rest within the circular groove 446 and are not forced outwards into the corresponding apertures 442 and 444.

Figure 6:
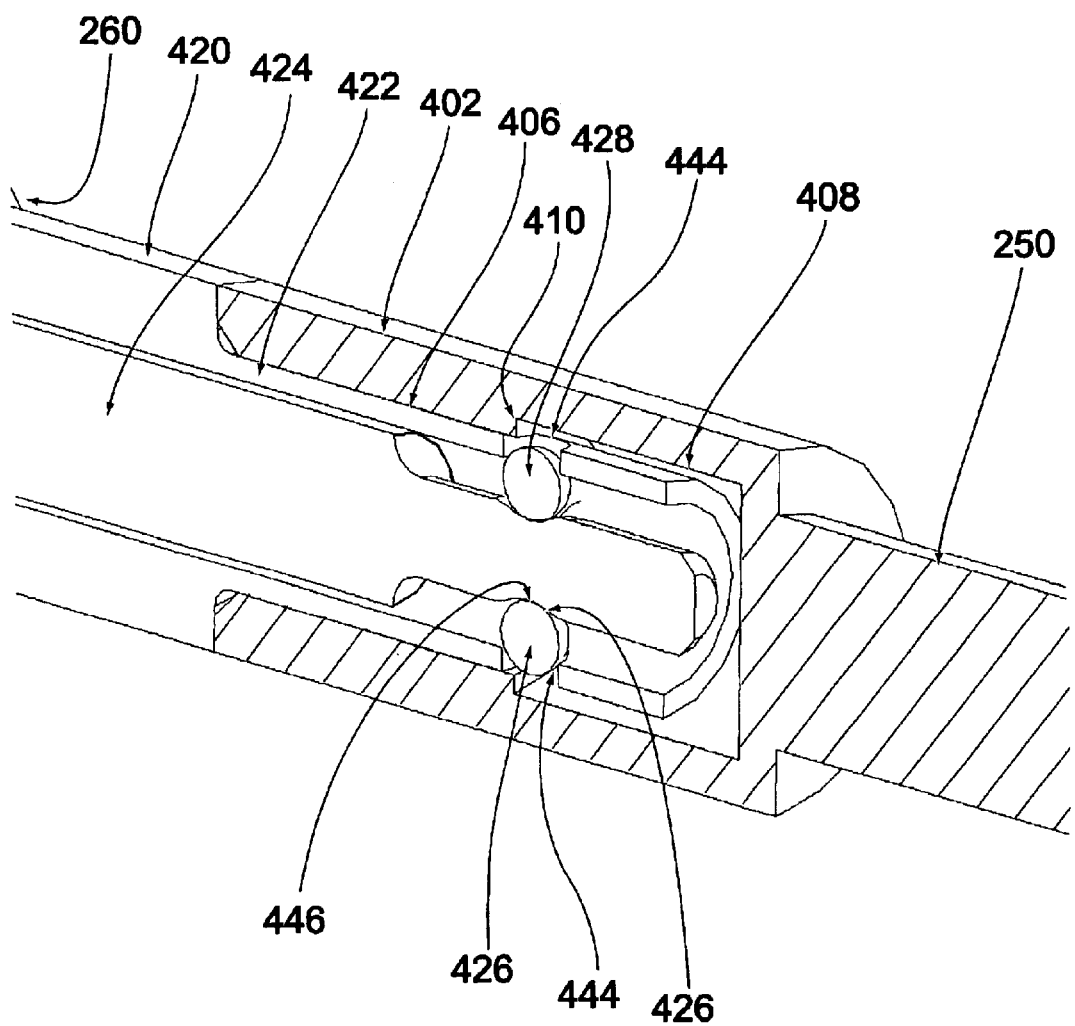
FIG. 6 is a more detailed cross sectional view of the hinge pin and the tool of FIG. 5 in a coupled state.

FIG. 6 is a more detailed cross sectional view of the hinge pin 250 and the tool 260 of FIG. 5 in a coupled state. FIG. 6 shows in more detail how when the tool 260 is in a state of use, the ball bearings 426 and 428 rest within the circular groove 446 and are not forced outwards into the corresponding apertures 442 and 444.

Figure 7:
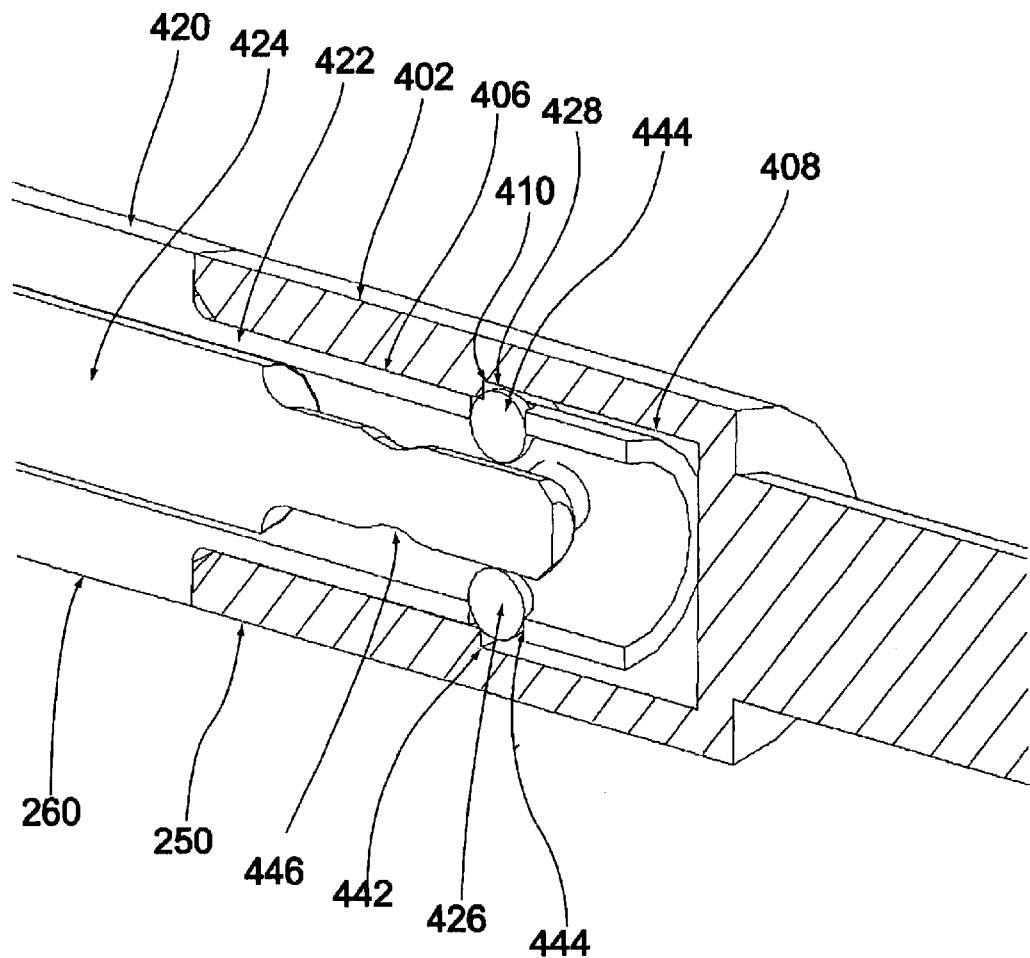
FIG. 7 is a more detailed cross sectional view of the hinge pin and the tool of FIG. 5 during extraction of the hinge pin.

FIG. 7 is a more detailed cross sectional view of the hinge pin 250 and the tool 260 of FIG. 5 during extraction of the hinge pin 250. FIG. 7 shows the tool 260 in a state of rest. When the tool 260 is in a state of rest, the handle 430 and the connected rod 424 are no longer being pushed in the distal direction and the spring 434 is allowed to naturally expand within its cavity and exerts pressure against the groove stop 438 in the distal direction and pressure against the toroidal shaped structure 436 in the proximal direction. This results in the rod 424 and the connected handle 430 to be pushed in the proximal direction. However, groove stop 440 contacts the toroidal shaped structure 436 and prevents the rod 424 and the connected handle 430 from traveling further in the proximal direction.

In addition, when the handle 430 is pushed as far as possible in the proximal direction, the ball bearings 426 and 428 do not rest within the circular groove 446. There is not enough space in between the inner diameter of the bushing 420 and the outer diameter of the distal end portion of the rod 424 for the ball bearings 426 and 428 to lie. Therefore, the bearings 426 and 428 are forced outwards into the corresponding apertures 442 and 444 such that they protrude from their respective apertures. That is, pressure is exerted upon the ball bearings 426 and 428 by the outer diameter of the distal end portion of the rod 424 in the direction of the apertures 442 and 444 such that the ball bearings 426 and 428 protrude from their respective apertures. FIG. 7 shows more detail as to how the ball bearings 426 and 428 protrude from the apertures 442 and 444.

As the ball bearings 426 and 428 protrude from the apertures 442 and 444, the end portion 422 of the bushing 420 is positioned as deep into the bore 404 of the hinge pin 250 as possible. Note that the distance between the distal end of the bore 404 and the groove stop 410 is greater than the distance between the distal end of the bushing 420 and the apertures 442 and 444. This is necessary because if the apertures 442 and 444 were positioned within the first inner diameter 406 of the bore 404, then the ball bearings 426 and 428 would not protrude from the apertures 442 and 444 as the first inner diameter 406 of the bore 404 is flush against the third outer diameter of the end portion 422 of the bushing 420 (as defined above, the first inner diameter is substantially identical to the third outer diameter).

As FIG. 7 shows, the ball bearings 426 and 428 protrude from the apertures 442 and 444 below or distally from the groove stop 410. Furthermore, the ball bearings 426 and 428 protrude from the apertures 442 and 444 to such an extent that they produce an outer diameter for the bushing 420 that is greater than the first inner diameter 406. This prevents the bushing 420 (and consequently, the tool 260) from being removed from the bore 404 (and consequently, the hinge pin 250). As such, when the tool 260 is pulled in the proximal direction along the main axis, the protruding ball bearings 426 and 428 contact the distal-facing surface of the groove stop 410, resulting in the hinge pin 250 being pulled in the proximal direction along the main axis.

V. Security Feature

In an embodiment of the present invention, the tool 260, while in a state of use, is inserted into a bore 404 of a hinge pin 250 that is used for pivotally connecting two elements 102 and 104 of a portable computer (such as in FIG. 1). The end portion 422 of the bushing 420 of the tool 260 is inserted as far as possible into the bore 404 of a hinge pin 250. Next, the tool 260 is placed in a state of rest. As a result, the ball bearings 426 and 428 protrude from the apertures 442 and 444 below or distally from the groove stop 410. Then, the tool 260 is pulled in the proximal direction along the main axis. As a result, the protruding ball bearings 426 and 428 contact the distal-facing surface of the groove stop 410 and the hinge pin 250 is pulled in the proximal direction along the main axis. The hinge pin 250 is pulled free from the portable computer, which is now ready for maintenance.

Stated differently, the distance L is selected for a matched set of a tool 260 and a hinge pin 250. The matched set provides additional security since only the tool 260 with the correct corresponding distance L can be used with a hinge pin 250 with a given distance L. This reduces the possibility of unauthorized access to the portable computer system. Reducing unauthorized access is important to safe guard not only electrical contents oft the computer but to ensure that warranty service is not voided.

Lastly, it is important to note that any combination of material including metal, plastic, ceramic, composites, whether natural or man made which are adaptable for use as a hinge pin 250, tool 260, and computer housing is within the true scope and spirit of the present invention.

VI. Alternate Embodiment of Pin and Upper and Lower Portions

Figure 9:
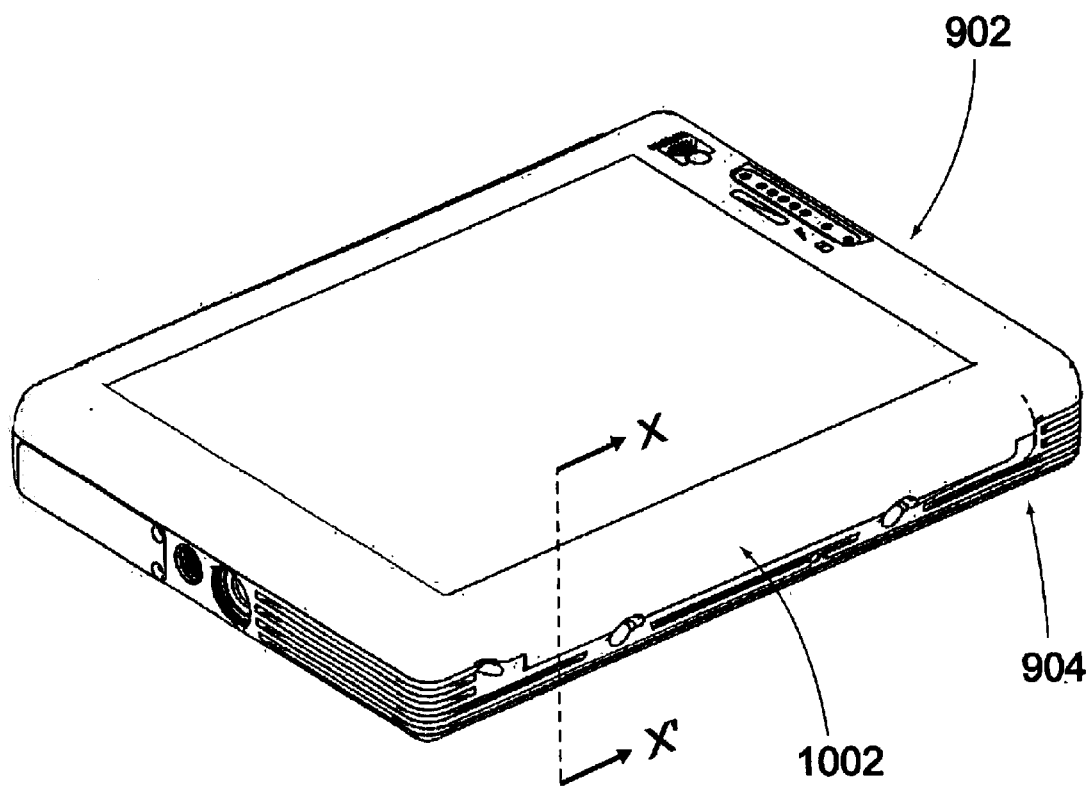
FIG. 9 is an illustration of a tablet portable computer according to another embodiment of the present invention.
Figure 10:
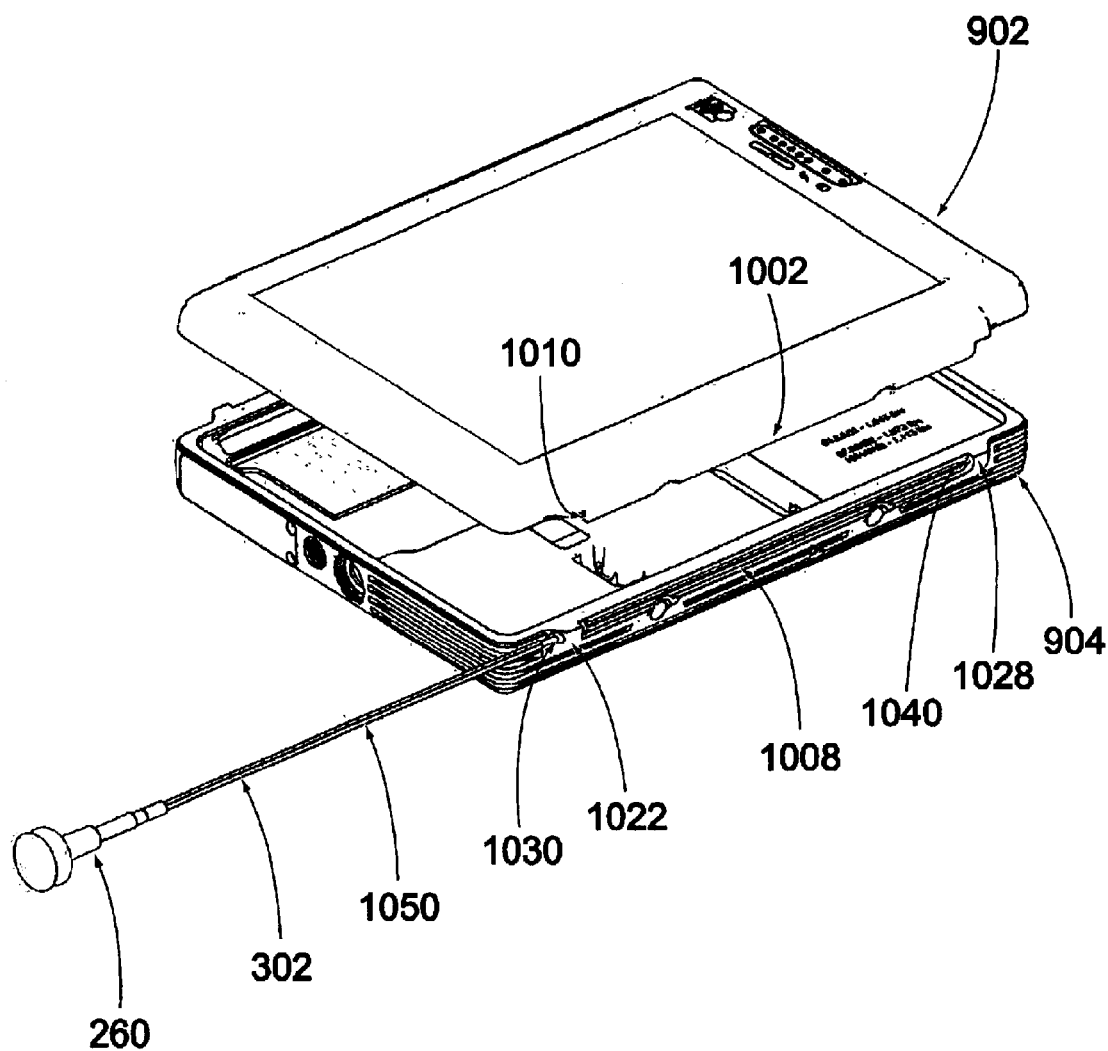
FIG. 10 is an illustration of an alternate embodiment of the tablet portable computer of FIG. 9 in a disassembled state.

FIG. 9 is an illustration of a tablet portable computer according to another embodiment of the present invention. In this embodiment, the upper portion 902 has only a single finger 1002, which couples with the lower portion 904. This single upper finger 1002 is shown in FIG. 10 in a disassembled state. The lower portion 904 of the tablet portable computer includes a plurality of fingers 1022 and 1028 aligned along a second axis 302 that runs along an edge of the lower portion 904 of the tablet portable computer. Each finger 1022 and 1028 extends upwards from the lower portion 904 and extends horizontally along the second axis. Between each finger is a gap that separates the two. Finger 1002 includes aperture 1010, finger 1022 includes aperture 1030, finger 1028 includes aperture 1040. The apertures 1030 and 1040 are aligned collinearly along the second axis 302. It should be noted that the lower portion 904 includes another set of fingers and apertures on the opposite side of upper portion 902 (not shown).

As described above for the first embodiment, the upper portion 902 and the lower portion 904 are joined. Consequently, the aperture 1010 of the upper portion 902 is collinearly aligned along the axis with the apertures 1030 and 1040 of the lower portion 904 when the upper portion 902 and the lower portion 904 are joined as shown. This is more clearly illustrated in FIG. 11.

Figure 11:
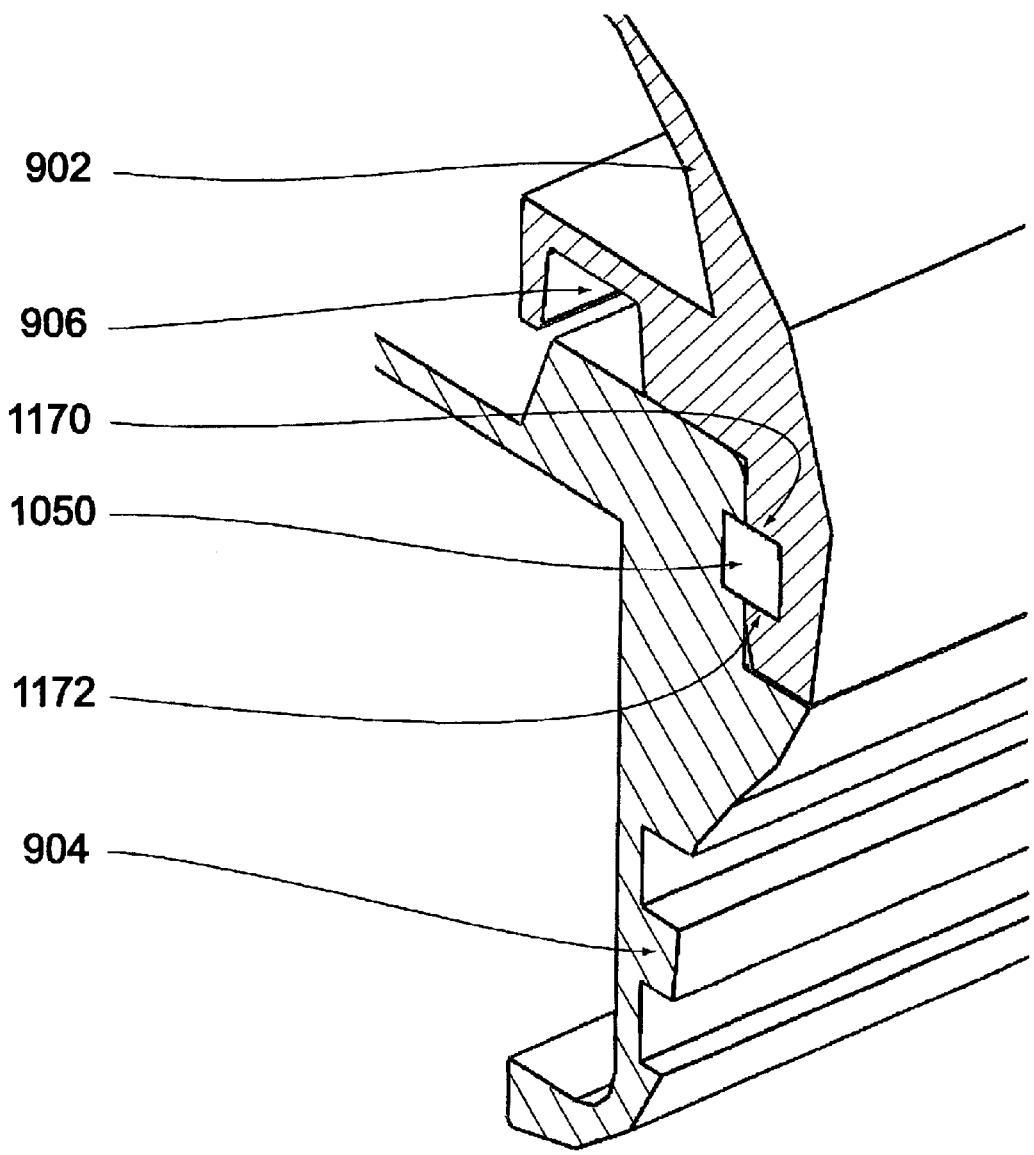
FIG. 11 is a sectional view of the tablet portable computer of FIG. 9 taken along axis X-X' illustrating a pin joining the upper and lower portions of the computer according to the invention.

FIG. 11 is a sectional view of the tablet portable computer of FIG. 9 taken along axis X-X'illustrating a pin joining the upper and lower portions of the computer according to the invention. Shown are the upper portion 902 and the lower portion 904 with a pin 1050. An upper o-ring channel is shown 906. In this embodiment the pin 1050 is not circular or oval as shown in the first embodiment, but rather the pin is a polygon and in this particular case a rectangle. The forces on surface 1170 and 1172 keeps the two halves from rotating relative to each other around the pin 1050.

It is important to note that in either this embodiment or the first embodiment, the number of fingers on the lower and upper portions of the tablet computer is variable from one, two, three, four, or more. Moreover, the type and arrangement of fingers in these exemplary embodiments in the top portion and the lower portion are interchangeable within the true scope and spirit of the present invention.

VII. Exemplary Implementations of Electronics

Figure 8:
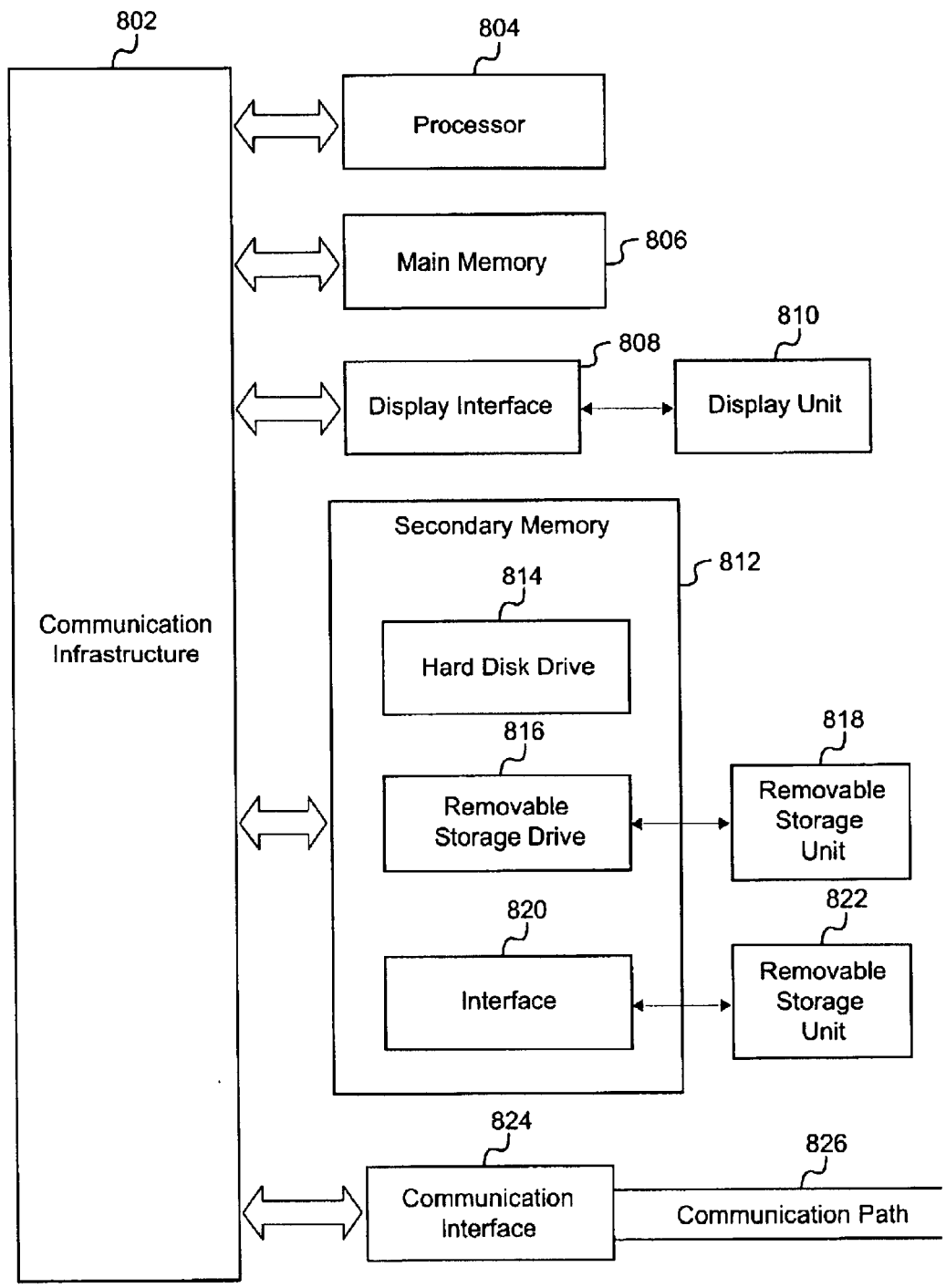
FIG. 8 is a block diagram of a computer system useful for implementing an embodiment of the present invention

The portable computer of the present invention can be realized in various ways. FIG. 8 is a block diagram of a computer system useful for implementing an embodiment of the present invention. The computer system includes one or more processors, such as processor 804. The processor 804 is connected to a communication infrastructure 802 (e.g., a communications bus, cross-over bar, or network). After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents a floppy disk, magnetic tape, optical disk, etc. which is read by and written to by removable storage drive 816. As will be appreciated, the removable storage unit 818 includes a computer usable storage medium having stored therein computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCM-CIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

V. Conclusions

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A hinge pin for pivotally coupling two elements at a hinge, comprising:
    a rod with a proximal end and a distal end, the rod including having a main axis and a first outer diameter;
    a bore in the proximal end of the rod having a first inner diameter, wherein the bore is aligned along the main axis;
    a distal portion of the bore having a second inner diameter larger than the first inner diameter; and
    a groove stop within the bore formed by the juxtaposition of the first inner diameter and the second inner diameter, wherein the groove stop provides a surface for pulling the hinge pin along the main axis in a proximal direction.

2. The hinge pin of claim 1, further comprising:
    second outer diameter in the proximal end of the rod, wherein the second diameter is larger than the first diameter.

3. The hinge pin of claim 1, wherein the first inner diameter corresponds to an outer diameter of a tool for inserting and/or extracting the hinge pin from two elements which are joined at a hinge.

4. The hinge pin of claim 1, wherein the two elements are components of a computer.

5. The hinge pin of claim 2, wherein the bore extends only into the proximal portion of the rod with a second outer diameter larger than the first diameter.

6. The hinge pin of claim 3, wherein a distance from the distal end of the bore to the groove stop corresponds to a distance from a distal end of the tool to at least one aperture in the tool from which at least one ball bearing protrudes.

7. A system for pivotally coupling two elements, comprising:
    a hinge pin for pivotally coupling two elements by a hinge, including:
        a rod with a proximal end and a distal end, the rod including a main axis and a first outer diameter;
        a bore in the proximal end of the rod having a first inner diameter, wherein the bore is aligned along the main axis;
        a distal portion of the bore having a second inner diameter larger than the first inner diameter; and
        a groove stop within the bore formed by the juxtaposition of the first inner diameter and the second inner diameter, wherein the groove stop provides a surface for pulling the hinge pin along the main axis in a proximal direction; and
    a tool for inserting and/or extracting the hinge pin from two elements which are joined by a hinge, wherein the tool is inserted into the bore and contacts the surface provided by the groove stop, thereby allowing the hinge pin to be pulled along the main axis in a proximal direction.

8. The system of claim 7, wherein the tool comprises:
    a bushing aligned along the main axis, having a third outer diameter smaller than the first inner diameter;
    a rod aligned along the main axis positioned within the bushing;
    at least one ball bearing having a fourth diameter located between the rod and the bushing at a distal end of the rod and the bushing;
    at least one aperture in the distal end of the bushing adjacent to the at least one ball bearing, the at least one aperture having a fifth diameter smaller than the fourth diameter, wherein the at least one ball bearing protrudes from the at least one aperture when the at least one ball bearing is pushed against the at least one aperture; and
    a circular groove around the distal end of the rod, wherein when the at least one ball bearing is positioned within the circular groove, the at least one ball bearing does not protrude from the at least one aperture, and wherein when the at least one ball bearing is not positioned within the circular groove, the at least one ball bearing protrudes from the at least one aperture,
    wherein the tool is inserted into the bore and the rod is moved such that the at least one ball bearing is not positioned within the circular groove, causing the at least one ball bearing to protrude from the at least one aperture and contact the surface provided by the groove stop, thereby allowing the tool and the hinge pin to be pulled along the main axis in a proximal direction.

9. The system of claim 8, wherein the two elements are components of a computer.

10. The system of claim 8, wherein the hinge pin further comprises:
    a proximal portion of the rod having a second outer diameter larger than the first diameter.

11. The system of claim 8, wherein the first inner diameter corresponds to the third outer diameter.

12. The system of claim 10, wherein the bore extends only into the proximal portion of the rod having a second outer diameter larger than the first diameter.

13. The system of claim 11, wherein a distance from a distal end of the bore to the groove stop corresponds to a distance from a distal end of the tool to the at least one aperture.

14. A portable computer, comprising:
- a first element including one or more fingers, each finger having an aperture aligned along a main axis;
- a second element including one or more fingers, each finger having an aperture aligned along the main axis; and
- a hinge pin for pivotally coupling the first and the second elements by a hinge including:
  - a rod with a proximal end and a distal end, the rod including a main axis and a first outer diameter,
  - a bore in the proximal end of the rod having a first inner diameter, wherein the bore is aligned along the main axis;
  - a distal portion of the bore having a second inner diameter larger than the first inner diameter; and
  - a groove stop within the bore formed by the juxtaposition of the first inner diameter and the second inner diameter, wherein the groove stop provides a surface for pulling the hinge pin along the main axis in a proximal direction.

15. The portable computer of claim 14, further comprising:
- a tool for inserting and/or extracting the hinge pin from the first and the second elements, wherein the tool is inserted into the bore and contacts the surface provided by the groove stop, thereby allowing the hinge pin to be pulled along the main axis in a proximal direction.

16. The portable computer of claim 15, wherein the tool comprises:
- a bushing aligned along the main axis, having a third outer diameter smaller than the first inner diameter;
- a rod aligned along the main axis positioned within the bushing;
- at least one ball bearing having a fourth diameter located between the rod and the bushing at a distal end of the rod and the bushing;
- at least one aperture in the distal end of the bushing adjacent to the at least one ball bearing, the at least one aperture having a fifth diameter smaller than the fourth diameter, wherein the at least one ball bearing protrudes from the at least one aperture when the at least one ball bearing is pushed against the at least one aperture; and
- a circular groove around the distal end of the rod, wherein when the at least one ball bearing is positioned within the circular groove, the at least one ball bearing does not protrude from the at least one aperture, and wherein when the at least one ball bearing is not positioned within the circular groove, the at least one ball bearing protrudes from the at least one aperture,
- wherein the tool is inserted into the bore and the rod is moved such that the at least one ball bearing is not positioned within the circular groove, causing the at least one ball bearing to protrude from the at least one aperture and contact the surface provided by the groove stop, thereby allowing the tool and the hinge pin to be pulled along the main axis in a proximal direction.

17. The portable computer of claim 16, wherein the hinge pin further comprises:
- a proximal portion of the rod having a second outer diameter larger than the first diameter.

18. The portable computer of claim 16, wherein the first inner diameter corresponds to the third outer diameter.

19. The portable computer of claim 17, wherein the bore extends only into the proximal portion of the rod having a second outer diameter larger than the first diameter.

20. The portable computer of claim 18, wherein a distance from a distal end of the bore to the groove stop corresponds to a distance from a distal end of the tool to the at least one aperture.

\* \* \* \* \*